United States Patent [19]

Sumihiro et al.

[11] Patent Number: 5,905,534
[45] Date of Patent: May 18, 1999

[54] PICTURE DECODING AND ENCODING METHOD AND APPARATUS FOR CONTROLLING PROCESSING SPEEDS

[75] Inventors: Hiroshi Sumihiro, Kanagawa; Seiichi Emoto, Tokyo; Takashi Fukuyama, Kanagawa, all of Japan

[73] Assignee: Sony Corporation, Tokyo, Japan

[21] Appl. No.: 08/392,865

[22] PCT Filed: Jul. 12, 1994

[86] PCT No.: PCT/JP94/01141

§ 371 Date: Apr. 12, 1995

§ 102(e) Date: Apr. 12, 1995

[87] PCT Pub. No.: WO95/02948

PCT Pub. Date: Jan. 26, 1995

[30] Foreign Application Priority Data

Jul. 12, 1993 [JP] Japan .................................. 5-171921

[51] Int. Cl.⁶ .............................. H04N 7/12; H04N 11/02; H04N 11/04; H04N 5/92
[52] U.S. Cl. .......................... 348/402; 348/407; 348/413; 348/416; 386/111; 386/112
[58] Field of Search ..................................... 348/384, 390, 348/400–403, 405, 409–413, 415, 416, 699, 407; 358/335, 342; 382/232, 233, 236, 238; 386/109, 111, 112; H04N 5/92, 5/76, 7/12, 11/02, 11/04

[56] References Cited

U.S. PATENT DOCUMENTS

| 4,489,351 | 12/1984 | D'Alayer De Cosemore D'Arc ... | 358/906 |
| 5,091,782 | 2/1992 | Kause et al. ............................ | 348/400 |
| 5,196,932 | 3/1993 | Hoshi ..................................... | 348/384 |
| 5,212,549 | 5/1993 | Ng et al. . | |
| 5,212,742 | 5/1993 | Normile et al. . | |
| 5,357,282 | 10/1994 | Lee ......................................... | 348/403 |
| 5,420,636 | 5/1995 | Kojima .................................. | 348/403 |
| 5,455,629 | 10/1995 | Sun et al. .............................. | 348/402 |
| 5,485,279 | 1/1996 | Yonemitsu ............................. | 348/411 |

FOREIGN PATENT DOCUMENTS 61-198988   9/1986   Japan .

OTHER PUBLICATIONS

Yonezawa, Jun, "MPEG Standard Plan Video Part (ISO11172 Video)", *Image Electronics Society Journal*, vol. 20, No. 4, Aug. 1991, pp. 306–323.

Artieri, A. et al: "A CHIP Set Core For Image Compression", IEEE Transactions On Consumer Electronics, vol. 36, No. 3, Aug. 1, 1990, pp. 395–402, XP000162866.

*Primary Examiner*—Thai Tran
*Attorney, Agent, or Firm*—Frommer Lawrence & Haug, LLP.; William S. Frommer

[57] ABSTRACT

In accordance with this invention, in a moving picture decoding apparatus, MB (Macro Block) buffer 111 is provided to thereby absorb difference between read speed from IDCT (Inverse Discrete Cosine Transform) circuit 110 and write speed into reference frame memory 117 of motion compensating section, and DRAM writing buffer 115 is provided to thereby carry out timing adjustment between read and write operations with respect to reference frame memory 117. Namely, adder 114 adds predictive macro block signal S10 from reference frame memory 117 and output signal S9 from MB buffer 111 to write added signal into DRAM writing buffer 115. DRAM writing buffer 115 holds data for a time period until reference frame memory 117 completes preparation for write operation thereafter to write those data into reference frame memory 117. Thus, inexpensive DRAM can be used as reference frame memory. In the case where read/write speed of reference frame memory 117 is higher than speed of IDCT circuit 110, one bank 116 is provided within DRAM writing buffer 115. Thus, since read-out operation of data inputted to this bank 116 is completed before next data is incoming, when the next block data is inputted, buffer 115 is in empty state. By such implementation, memory size necessary for timing adjustment buffer can be reduced. Thus, reduction of hardware scale can be realized.

32 Claims, 15 Drawing Sheets

PICTURE DECODING AND ENCODING METHOD AND APPARATUS FOR CONTROLLING PROCESSING SPEEDS

TECHNICAL FIELD

This invention relates to a picture decoding method and a picture decoding apparatus, and a picture encoding method and a picture encoding apparatus, and more particularly to a moving picture decoding method and a moving picture decoding apparatus, which are adapted to decode coded data obtained by transform encoding and predictive encoding to reproduce original picture data, and a moving picture encoding method and a moving picture encoding apparatus, which are adapted to locally decode coded data obtained by transform encoding and predictive encoding to obtain a predictive picture.

BACKGROUND ART

Hitherto, in systems for transmitting video signals of moving picture to remote place, such as, for example, television conference system or television telephone system, etc., or systems for recording video signals of moving picture onto picture recording media such as optical disc, magnetic disc or magnetic tape, etc., and reproducing recorded video signals of moving picture, in order to efficiently utilize transmission paths or recording media, video signals are caused to undergo so called efficient encoding by making use of line correlation or interframe correlation that video signals have to reduce redundancies in the spatial axis direction and in the time axis direction to transmit only significant information, thus to allow transmission efficiency to be higher.

For example, in encoding in the spatial axis direction (hereinafter referred to as intra-frame encoding), e.g., line correlation of video signal is utilized as indicated by A of FIG. 1. In the case where attempt is made to transmit respective pictures PC1, PC2, PC3 . . . constituting moving picture at times $t_1$, $t_2$, $t_3$, . . . , picture data to be subjected to transmission processing is one-dimensionally encoded, e.g., within the same scanning line, or, e.g., picture is divided into a plurality of blocks to two-dimensionally encode picture data of respective blocks to thereby carry out data compression, thus to improve transmission efficiency.

Moreover, in encoding in the time axis direction (hereinafter referred to as interframe encoding), interframe correlation of video signal is utilized. Namely, as indicated by B of FIG. 1, e.g., by so called predictive encoding, picture data PC12, PC23, . . . comprised of differences (so called predictive errors) of picture data every corresponding pixels between pictures PC1 and PC2, PC2 and PC3, . . . adjacent in succession are determined to transmit these picture data PC12, PC23, . . . to thereby carry out data compression, thus to improve transmission efficiency.

Thus, as compared to the case where all of pictures PC1, PC2, PC3, . . . are transmitted, it is possible to transmit video signals by extremely lesser data quantity.

Further, in the predictive encoding in the above-described interframe encoding, in order to allow efficiency to be higher, motion-compensated predictive coding is used. Namely, in the case where, e.g., a person in the center of picture (frame) moves, etc., with respect to an object moving in picture, its motion is detected to correct position of picture data used for prediction in the previous picture (frame) by that motion to carry out predictive coding, thereby making it possible to improve coding efficiency. However, even if such a method is employed, many data must be transmitted with respect to the portion where object moves and appears from behind. In view of this, motion-compensated prediction is carried out not only in the above-described forward direction, but also in backward direction or in both directions as combination thereof, thereby permitting coding efficiency to be higher.

As the representative system of motion-compensated predictive coding as described above, so called MPEG (Moving Picture Experts Group) 2 is known. MPEG 2 is general name of the moving picture coding system which has progressed in WG (Working Group) 11 of SC (Sub Committee) 29 of JTC (Joint Technical Committee) 1 of ISO (International Standardization Organization) and IEC (International Electro-technical Commission).

In MPEG 2, Hybrid system in which motion-compensated predictive coding and Discrete Cosine Transform (hereinafter referred to as DCT) are combined is-adopted.

Sequence employed when picture is caused to undergo intra-frame coding or inter-frame coding in MPEG 2 will now be described. FIG. 2 is a view showing the configuration of so called GOP (Group of Pictures) employed in MPEG 2. In FIG. 2, there is shown the example where GOP consists of 15 frames.

Since frame F2 is caused to undergo intra-frame coding, this frame is called I picture (Intra coded picture). Since frames F5, F8, F11, F14 are predicted only from the forward direction and are caused to undergo interframe coding, those frames are called P picture (Predictive coded picture). In addition, since frames F0, F1, F3, F4, F6, F7, F9, F10, F12, F13 are predicted from the forward direction, the backward direction or both directions and are caused to undergo interframe coding, those frames are called B picture (Bidirectionally-predictive picture).

One picture is divided into N slices as shown in FIG. 3, and each slice includes M macro blocks. Each macro block includes luminance data Y0, Y1, Y2, Y3 included in four luminance blocks each comprised of 8×8 pixels and adjacent in upper and lower directions and in left and right directions, and color difference data Cb, Cr of color difference blocks comprised of 8×8 pixels in the range corresponding to these four luminance blocks. Namely, macro block includes luminance data Y1~Y4 of 16×16 pixels continuous in horizontal and vertical scanning directions with respect to luminance signal, whereas, in two color difference signals corresponding thereto, after data quantity is caused to undergo reduction processing, they are subjected to time axis multiplexing processing so that data with respect to 16×16 pixels of luminance signal are assigned (allocated) to respective one color difference blocks.

Arrangement of picture data within slice is such that picture data are caused to be continuous in macro block units, and picture data are caused to be continuous in block units in order of raster scan within the macro block. In MPEG 2, coding or decoding processing is carried out in the above-described macro block units.

In actual terms, moving picture encoding apparatus in conformity with the MPEG 2 includes frame memory group 12 as shown in FIG. 4, and this frame memory group 12 is supplied with picture data from pre-processing circuit (not shown) through motion vector detecting circuit 11. Namely, the pre-processing circuit separates input video signal into luminance signal and color difference signal thereafter to convert them into luminance data and color difference data which respectively consist of 8 bits, and to reduce the number of pixels of color difference data to, e.g., one fourth (¼) in the case of, e.g., so called 4:2:0 to deliver these luminance data and color difference data to frame memory group 12 through motion vector detecting circuit 11.

The frame memory group 12 stores picture data of respective frames as picture data of reference original picture, forward original picture or backward original picture in accordance with sequence set in advance. In more practical sense, at the time of encoding picture data of frame F3 (B picture) shown in FIG. 2, for example, picture data of this frame F3 is stored as picture data of reference original picture, picture data of frame F2 (I picture) is stored as picture data of forward original picture, and picture data of frame F5 (P picture) is stored as picture data of backward original picture.

Motion vector detecting circuit 11 reads out picture data of respective frames stored in frame memory group 12 by the above-described data arrangement, i.e., block format to detect motion vector of reference original picture in macro block units. Namely, motion vector detecting circuit 11 detects motion vector of current reference picture in macro block units by using forward original picture and/or backward original picture stored in frame memory group 12. In this case, detection of motion vector is carried out so that a value such that sum of absolute values of differences between pictures of luminance data of macro block unit becomes minimum is caused to be corresponding motion vector. Then, the detected motion vector is delivered to motion compensating circuit 23, etc., and sum of absolute values of differences between pictures of macro block unit is delivered to intra-frame/forward/backward/bidirectionally predictive judging circuit 13.

This intra-frame/forward/backward/bidirectionally predictive judging circuit 13 determines predictive mode of macro block of reference original picture on the basis of this value to control predictive coding circuit 14 so as to carry out switching of intra-frame/forward/backward/bidirectional prediction in macro block units.

Predictive encoding circuit 14 is operative so that when intra-frame coding mode is set, it selects input picture data as it is, and when forward/backward/bidirectionally predictive mode is set, it selects difference (hereinafter referred to as difference data) every pixel of input picture data with respect to each predictive picture to deliver the selected data to DCT circuit 15. Namely, this predictive encoding circuit 14 includes adding circuits 14a, 14b, 14c and selector (changeover) switch 14d. These adding circuits 14a, 14b, 14c are supplied with picture data of forward predictive picture and backward predictive picture from motion compensating circuit 23 which will be described later. The adding circuit 14a generates difference data with respect to forward predictive picture, the adding circuit 14b generates difference data with respect to backward predictive picture, the adding circuit 14c generates difference data with respect to picture obtained by averaging forward predictive picture and backward predictive picture, and the selector switch 14d selects, by switching, any one of input picture data and difference data with respect to respective predictive pictures on the basis of predictive mode to deliver the selected data to DCT circuit 15.

The DCT circuit 15 allows input picture data or difference data to undergo DCT processing in block units by making use of the two-dimensional correlation of video signal to deliver coefficient data thus obtained (so called DCT coefficients) to quantizing circuit 16.

The quantizing circuit 16 quantizes coefficient data by using quantization scale (quantization step size) determined every macro block or slice to deliver quantized data thus obtained to Variable Length Coding (hereinafter referred to as VLC) circuit 17 and inverse quantizing circuit 18. In this example, quantization scale used in such quantization is determined by carrying out feedback of buffer remaining quantity of transmitting buffer memory 19 which will be described later so that it becomes equal to a value such that the transmitting buffer memory 19 dose not break down. This quantization scale is also delivered to VLC circuit 17 and inverse quantizing circuit 18.

The VLC circuit 17 implements variable length coding to quantized data along with quantization scale, predictive mode and motion vector to deliver coded data thus obtained to transmitting buffer memory 19.

The transmitting buffer memory 19 once (temporarily) stores coded data thereafter to read out it at a fixed bit rate to thereby smooth the coded data to output it as bit stream, and to feed quantization control signal of macro block unit back to quantizing circuit 16 in accordance with remaining data quantity remaining in the memory to control quantization scale. Thus, the transmitting buffer memory 19 adjusts data quantity generated as bit stream to maintain data of reasonable remaining quantity (data quantity such that overflow or underflow does not take place) in the memory. For example, when the data remaining quantity increases up to allowed upper limit, transmitting buffer memory 19 allows quantization scale of quantizing circuit 16 to be greater by quantization control signal to thereby reduce data quantity of quantized data. On the other hand, when the data remaining quantity decreases down to allowed lower limit, transmitting buffer memory 19 allows quantization scale of quantizing circuit 16 to be smaller by quantization control signal to thereby increase data quantity of quantized data.

In this way, bit streams outputted from transmitting buffer memory 19 are delivered to moving picture decoding apparatus at a fixed bit rate through transmission paths or transmission media comprised of recording medium such as optical disc, magnetic disc or magnetic tape, etc.

On the other hand, inverse quantizing circuit 18 inverse-quantizes quantized data delivered from quantizing circuit 16 to reproduce coefficient data (to which quantization distortion is added) corresponding to output of the above-described DCT circuit 15 to deliver this coefficient data to Inverse Discrete Cosine Transform (hereinafter referred to as IDCT) circuit 20.

The IDCT circuit 20 allows coefficient data to undergo IDCT processing to reproduce picture data corresponding to input picture data when intra-frame coding mode is set, and to reproduce difference data corresponding to output of predictive encoding circuit 14 when forward/backward/bidirectionally predictive mode is set to deliver them to adding circuit 21.

This adding circuit 21 is supplied, when forward/backward/bidirectionally predictive mode is set, with motion-compensated picture data of forward predictive picture or backward predictive picture (hereinafter referred to as predictive picture data) from motion compensating circuit 23, and adds this motion-compensated predictive picture data and difference data to thereby reproduce picture data corresponding to input picture data in macro block units.

Picture data reproduced in this way is stored into frame memory 22. Namely, inverse quantizing circuit 18~motion compensating circuit 23 constitute a local decoding circuit to locally decode quantized data outputted from quantizing circuit 16 on the basis of predictive mode to store decode picture thus obtained into frame memory 22 as forward predictive picture or backward predictive picture. In more practical sense, frame memory 22 is comprised of a semiconductor memory having memory capacity corresponding to two frames (hereinafter memory corresponding to one frame will be called frame buffer), and carries out bank switching of frame buffer to store picture data delivered from adding circuit 21 as forward predictive picture data or backward predictive picture data. With respect to the stored picture data, in dependency upon picture to be encoded, picture data of single frame is outputted as forward predictive picture data, or is outputted as backward predictive picture data. These predictive picture data are entirely the same as pictures reproduced at moving picture decoding apparatus which will be described later, and picture to be subjected to encoding processing next is caused to undergo forward/backward/bidirectionally predictive encoding on the basis of this predictive picture.

In actual terms, motion compensating circuit 23 implements motion compensation to picture data from frame memory 22 on the basis of predictive mode and motion vector to read out the motion-compensated picture data to deliver the predictive picture data thus read out to predictive coding circuit 14 and adding circuit 21 as described above.

Moving picture decoding apparatus will now be described.

The moving picture decoding apparatus includes receiving buffer memory 31 as shown in FIG. 5. Bit stream is inputted to the receiving buffer memory 31 through transmission paths or transmission media. The receiving buffer memory 31 once (temporarily) stores that bit stream thereafter to deliver it to variable length decoding circuit 32.

The variable length decoding circuit 32 allows bit stream, i.e., coded data to undergo variable length decoding to reproduce quantized data, motion vector, predictive mode, quantization scale, and the like. These quantized data and quantization scale are delivered to inverse quantizing circuit 33, and motion vector, predictive mode and the like are delivered to motion compensating circuit 38.

Operations of inverse quantizing circuit 33~motion compensating circuit 38 are the same as that of the local decoding circuit of the above-described moving picture encoding apparatus. These circuits carry out decoding by using quantized data, motion vector, predictive mode, quantization scale, and forward predictive picture data and backward predictive picture data already reproduced and stored in frame buffers 37a, 37b of frame memory 37. As a result, reproduction picture data is outputted from adding circuit 35 by the block format.

However, in the conventional moving picture encoding apparatus and moving picture decoding apparatus, more practical configuration for absorbing (buffering) difference of processing speed occurring between respective processing blocks was not proposed.

This invention has been made in view of such actual circumstances, and its object is to provide a picture decoding method and a picture decoding apparatus, and a picture encoding method and a picture encoding apparatus which are capable of absorbing difference of processing speed occurring between respective processing blocks.

Another object of this invention is to provide a picture decoding method and a picture decoding apparatus, and a picture encoding method and a picture encoding apparatus which are capable of improving utilization efficiency of buffer memory used for absorbing difference of processing speed between respective blocks, and reducing capacity of buffer to reduce the entire memory capacity, thus permitting the circuit scale to be reduced.

SUMMARY OF THE INVENTION

A picture decoding method according to this invention is directed to a picture decoding method of decoding a coded picture signal encoded by using predictive coding and DCT processing, the method comprising the steps of implementing IDCT processing to DCT coefficients, storing the IDCT processed data into a first buffer, adding a predictive picture read out from a reference memory and data read out from the first buffer to generate a decoded picture, storing the decoded picture into a second buffer, and storing the decoded picture read out from the second buffer into the reference memory.

By such a configuration, difference of processing speed occurring between respective processing blocks can be absorbed.

Moreover, a picture decoding method according to this invention is directed to a picture-decoding method of decoding a coded picture signal encoded by using predictive coding and DCT processing, the method comprising the steps of implementing IDCT processing to the DCT coefficients, storing the IDCT processed picture data into a first buffer, adding data read out from the first buffer and a predictive picture read out from a second buffer to generate a decoded picture, storing the decoded picture into a reference memory for generating the predictive picture, reading out the predictive picture from the reference memory, and storing the predictive picture read out from the reference memory into the second buffer.

Further, it is preferable that the first buffer doubles as the second buffer, and the decoded picture is read out in synchronism with write timing of the reference memory from the first buffer.

By applying such a picture decoding method to a picture decoding apparatus, it is possible to reduce memory capacity necessary for timing adjustment buffer, thus to reduce scale of hardware.

Furthermore, it is possible to realize a picture encoding method and a picture encoding apparatus in which the above-described picture decoding method is used for local decoding. Also in this case, it is possible to absorb difference of processing speed occurring between respective processing blocks. In addition, it is possible to reduce memory capacity necessary for timing adjustment buffer to reduce scale of hardware.

BEST MODE FOR CARRYING OUT THE INVENTION

Preferred embodiments of a picture decoding method and a picture decoding apparatus, and a picture encoding method and a picture encoding apparatus according to this invention will now be described with reference to the attached drawings.

Figure 6:
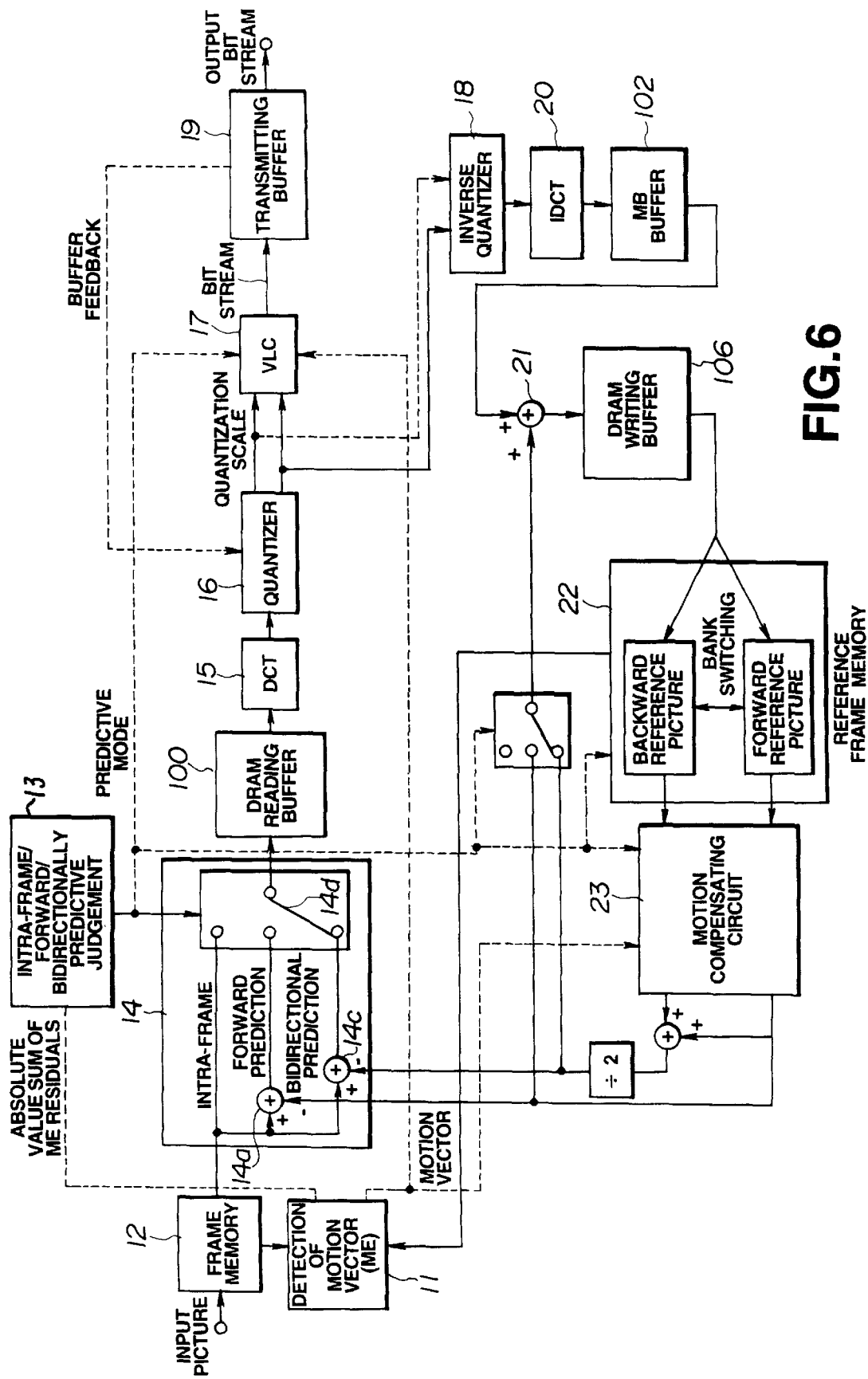
FIG. 6 is a block circuit diagram showing the configuration of a moving picture encoding apparatus which is a first embodiment of this invention.

FIG. 6 is a block circuit diagram showing outline of the configuration of moving picture encoding apparatus or encoder which is a first embodiment of this invention.

Figure 4:
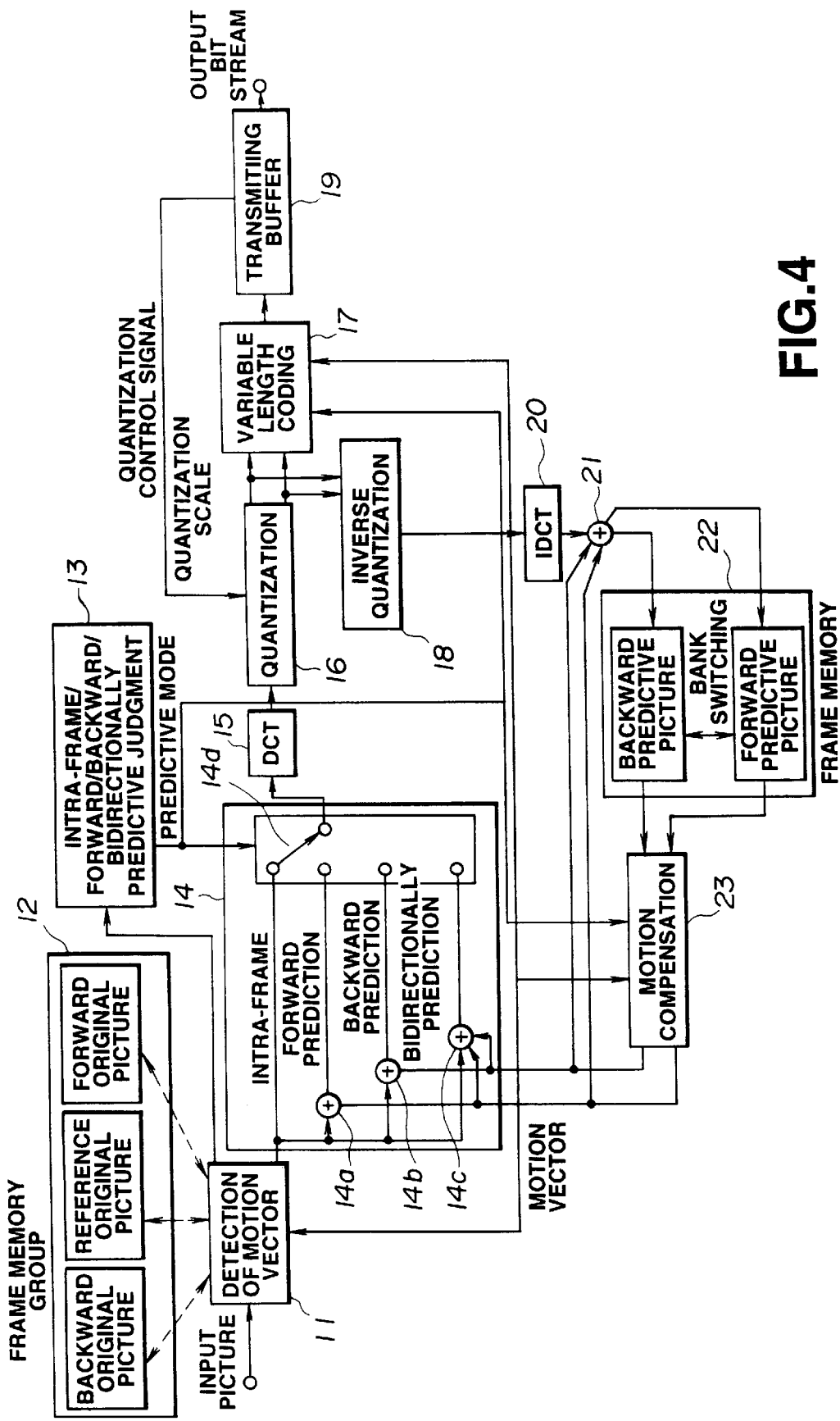
FIG. 4 is a block diagram showing an example of the conventional moving picture encoding apparatus.

In the FIG. 6, the same reference numerals are attached to portions corresponding to respective portions of the FIG. 4 previously mentioned, and their explanation will be omitted.

Figure 1:
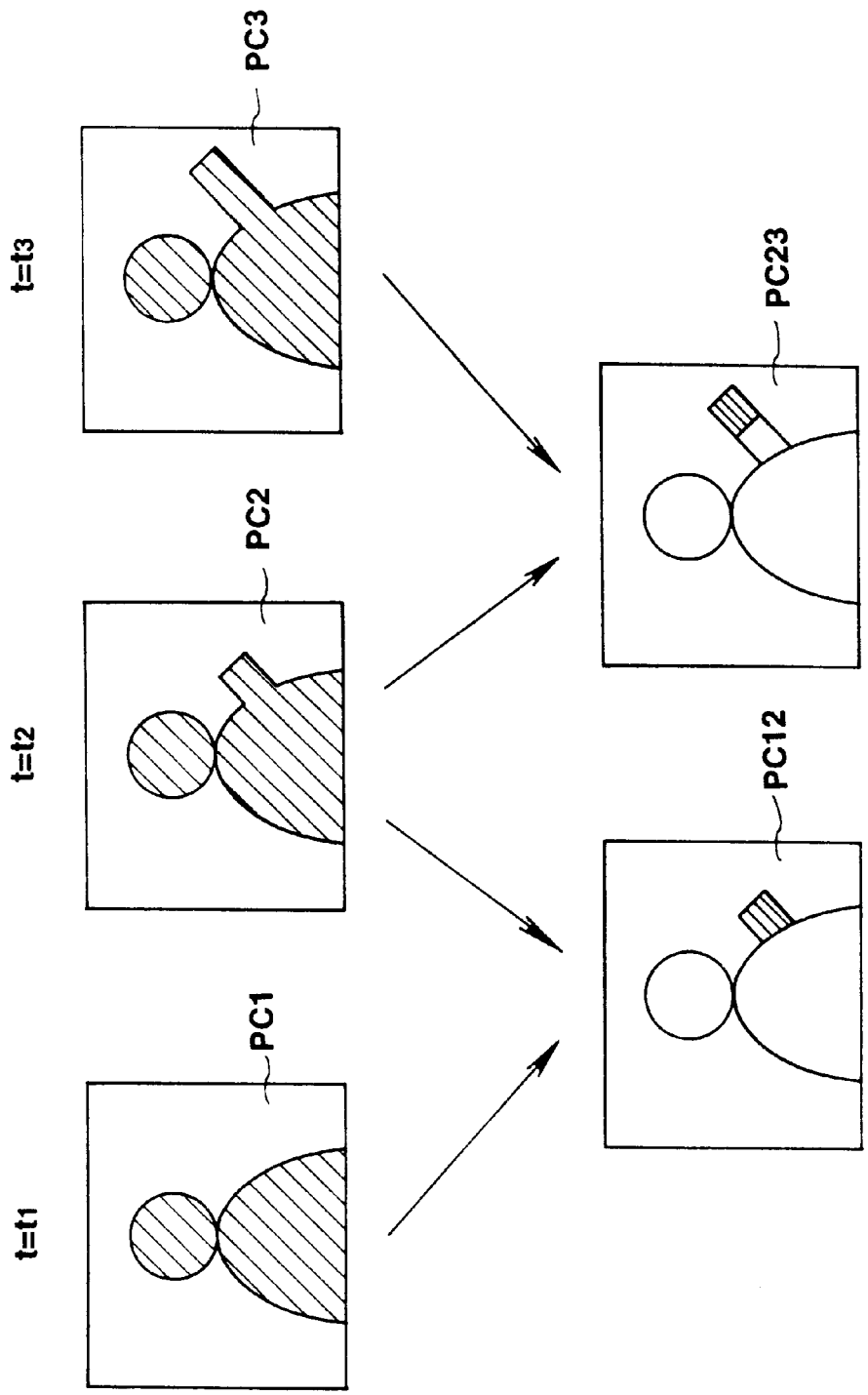
FIGS. 1A–1B are views for explaining the principle of efficient predictive encoding.
Figure 2:
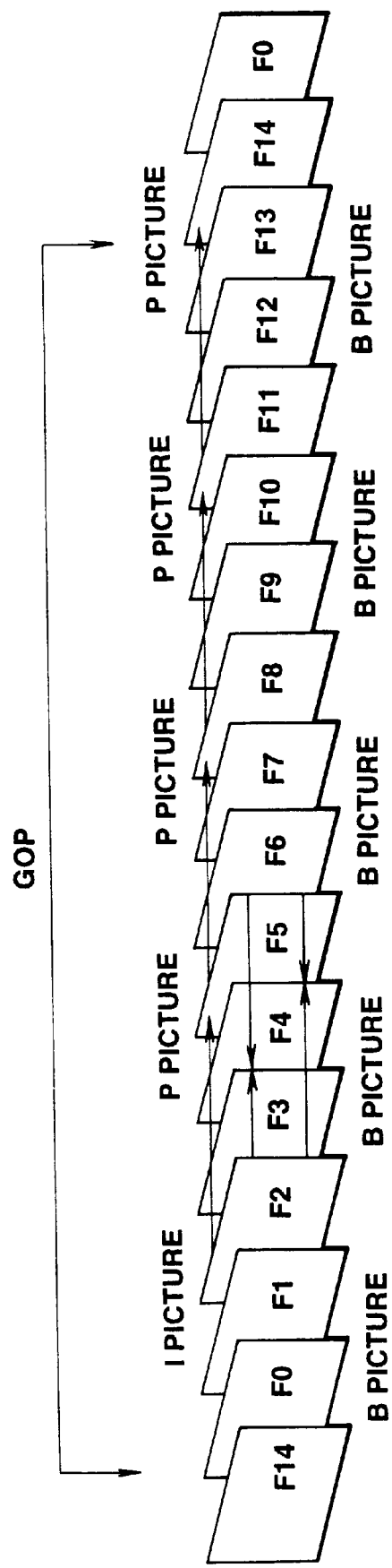
FIG. 2 is a view showing an actual configuration of GOP (Group of Pictures) of picture sequence.
Figures 3A, 3B, 3C, 3D, 3E, 3F:
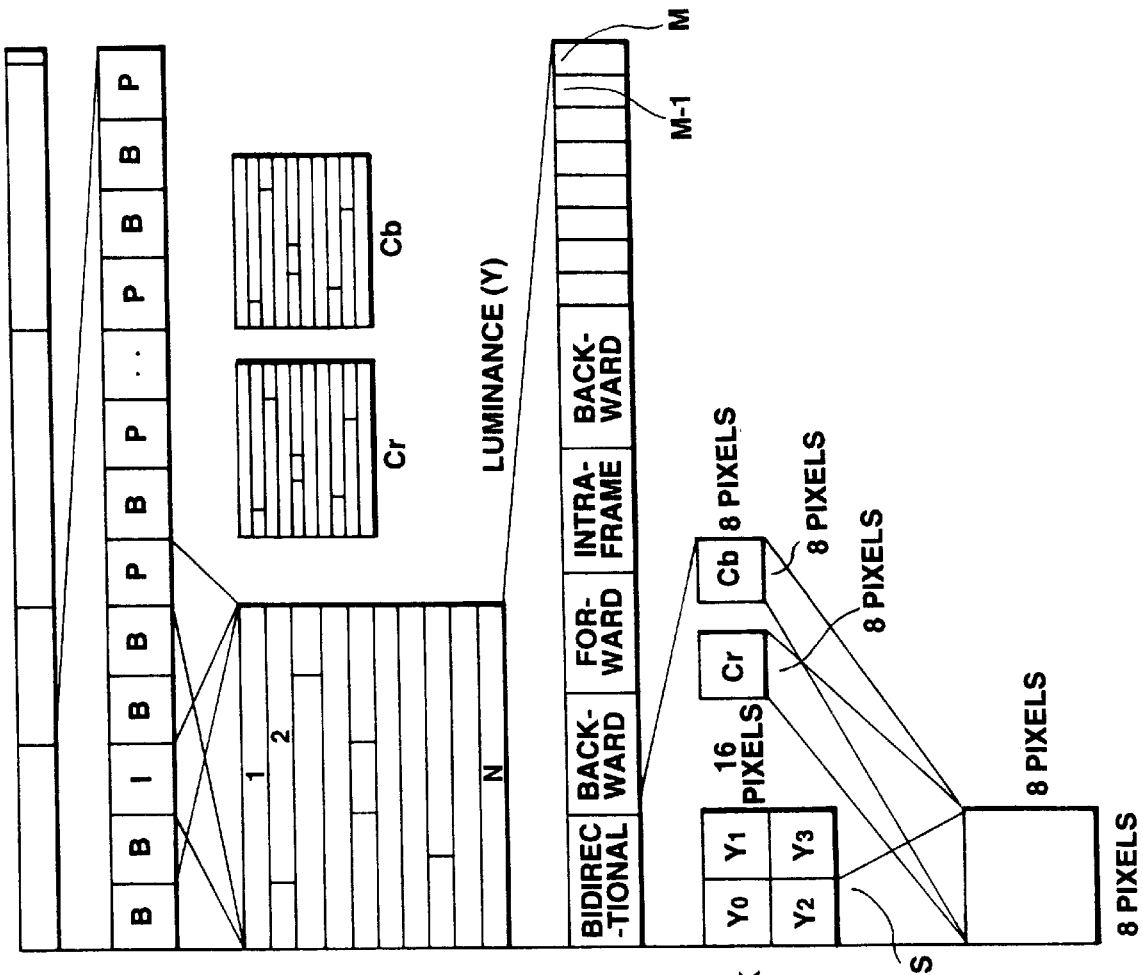
FIGS. 3A–3F are views showing an actual configuration of picture.

Motion vector detecting circuit 11 carries out detection of motion vector with respect to picture of block format inputted to the moving picture encoding apparatus of FIG. 6. The motion vector detecting circuit 11 carries out generation interpolation picture by using motion detection with non-interpolation frame being as a predictive picture as has been already explained with reference to FIG. 2. In view of this realization, in order to hold predictive picture for detecting motion, the motion vector detecting circuit 11 holds forward original picture and backward original picture to carry out detection of motion vector between corresponding picture and current reference picture. In this case, detection of motion vector is made so that a value such that sum of absolute values of differences between frames of macro block unit becomes minimum is caused to be corresponding motion vector. Sum of absolute values of differences between frames of macro block unit is sent to intra frame/forward/bidirectionally predictive judging circuit 13. The intra-frame/forward/bidirectionally predictive judging circuit 13 determines predictive mode of reference block on the basis of this value.

Predictive encoding circuit 14 carries out switching of intra-frame/forward/bidirectional prediction in macro block units on the basis of the predictive mode to generate input picture as it is in the case of intra-frame coding mode, and to generate inter-frame coded data from each predictive picture in the case of forward/bidirectionally predictive mode to output the difference data to Discrete Cosine Transform (DCT) circuit 15 through switching circuit 14d, and through DRAM reading buffer 100.

The DCT circuit 15 implements Discrete Cosine Transform processing to input picture data or difference data in block units by making use of the two-dimensional correlation of video signal to output transformed data obtained as the result of this processing to quantizing circuit 16.

The quantizing circuit 16 quantizes DCT processed data by quantization step size determined every macro block or slice to deliver quantized data obtained on the output terminal as the result thereof to Variable Length Coding (VLC) circuit 17 and inverse quantizing circuit 18. Quantization scale used for quantization is determined so as take a value so that transmitting buffer 19 does not break by providing feedback of buffer remaining quantity of transmitting buffer 19. This quantization scale is also delivered to variable length coding circuit 17 and inverse quantizing circuit 18 along with quantized data.

Variable length coding circuit 17 which has received quantized data allows quantized data to undergo variable length encoding processing along with quantization scale, predictive mode, motion vector and CBP (Code Block Pattern), etc. to transmit them as transmit data to transmitting buffer memory 19.

The transmitting buffer memory 19 once (temporarily) stores transmit data thereafter to output it as bit stream at a predetermined timing, and to feed quantization control signal of macro block unit back to quantizing circuit 16 in accordance with remaining data quantity remaining in the memory to control quantization scale. Thus, the transmitting buffer memory 19 adjusts data quantity generated as bit stream to maintain, in the memory, data of reasonable remaining quantity, i.e., data quantity such that overflow or underflow is not caused to take place. In connection with this, when data remaining quantity of transmitting buffer memory increases up to allowed upper limit, transmitting buffer memory allows quantization scale of quantizing circuit to be greater by quantization control signal to thereby decrease data quantity of quantized data.

In contrast, when data remaining quantity of transmitting buffer memory 19 decreases down to allowed lower limit value, transmitting buffer memory 19 allows quantization scale of quantizing circuit 16 to be smaller by quantization control signal to thereby increase data quantity of quantized data.

Inverse quantizing circuit 18 inverse-quantizes quantized data sent out from quantizing circuit 16 so that it takes representative value to decode transform data before transform processing in quantizing circuit 16 of output data to deliver inverse-quantized data to Inverse Discrete Cosine Transform (IDCT) circuit 20.

The IDCT circuit 20 transforms inverse-quantized data decoded at inverse quantizing circuit 18 into decode picture data by transform processing opposite to that of DCT circuit 15 to output it to motion compensating circuit 23 through Macro Block (MB) buffer 102, adder 21, DRAM writing buffer 106 and reference frame memory 22. The motion compensating circuit 23 carries out local decoding on the basis of output data of IDCT circuit 20, predictive mode and motion vector to write decode picture into frame memory 22 as forward reference picture or backward reference picture. In the case of forward/bidirectional prediction, since difference from reference picture is sent as output of IDCT circuit 20, this difference is added to reference picture to thereby carry out local decoding. This reference picture is entirely the same picture as picture decoded at decoder. With respect to picture to be processed next, forward/bidirectional prediction is carried out on the basis of this reference picture.

In this example, DRAM reading buffer 100, DRAM writing buffer 106 and MB buffer 102 are buffer required in the case where inexpensive memory such as DRAM (Dynamic Random Access Memory) is used as reference frame memory 22.

In all buffers, since there is necessity of once (temporarily) storing all pixels within block of 8×8, delay corresponding thereto takes place. Namely, DRAM reading buffer 100 is a buffer for absorbing difference between read speed from reference frame memory 22 and write speed into DCT circuit 15. Moreover, MB buffer 102 is a buffer for absorbing difference between read speed from IDCT circuit 20 and write speed into frame memory 22. DRAM writing buffer 106 is a buffer for adding data read out from reference frame memory 22 to output data from MB buffer 102 thereafter to provide delaying.

Since the reference frame memory 22 cannot carry out read and write operations at the same time, it is necessary to provide delaying before data read out from the reference frame memory 22 is written into the reference frame memory 22 for a second time. To realize this, the above-mentioned buffer (106) is required. Moreover, since access to reference frame memory 22 is very frequently carried out from various portions, it is desirable to minimized wasted time as much as possible. Also, so that reference frame memory 22 is utilized with the highest possible efficiency, this buffer (106) is inevitable at the preceding stage of reference frame memory 22.

Figure 7:
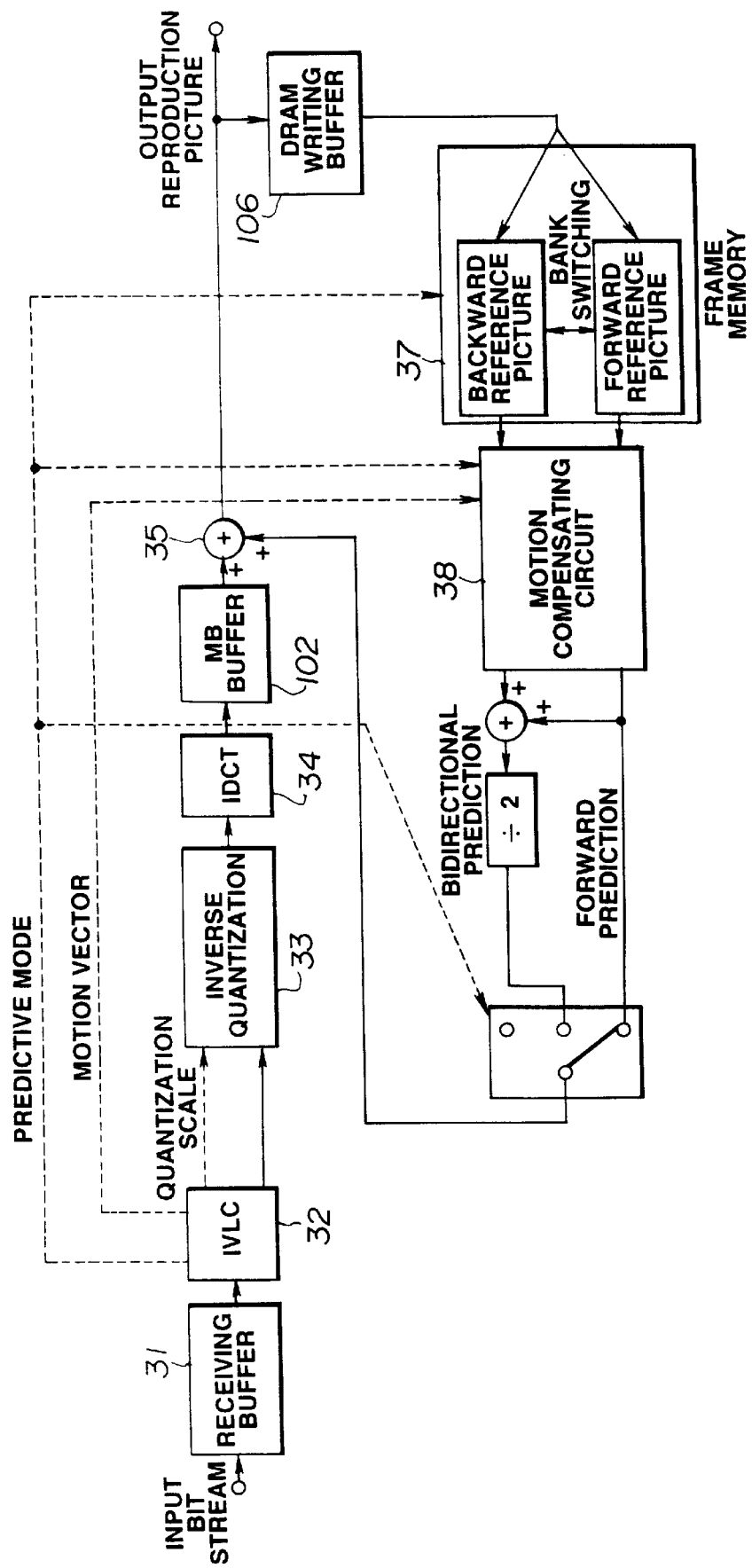
FIG. 7 is a block circuit diagram showing the configuration of a moving picture decoding apparatus which is the first embodiment of this invention.

Block diagram of moving picture decoding apparatus or decoder is shown in FIG. 7. In FIG. 7, the same reference numerals are attached to portions corresponding to respective portions of the FIG. 5 mentioned above, and their explanation is omitted.

Bit stream is inputted to the moving picture decoding apparatus of FIG. 7 through transmission media. This bit stream is inputted to variable length decoding (IVLC) circuit 32 through receiving buffer 31. The variable length decoding circuit 32 decodes quantized data, motion vector, predictive mode and quantization scale, etc. from the bit stream. The quantized data and the quantization scale are inputted to inverse quantizing circuit 33 of the succeeding stage.

Figure 5:
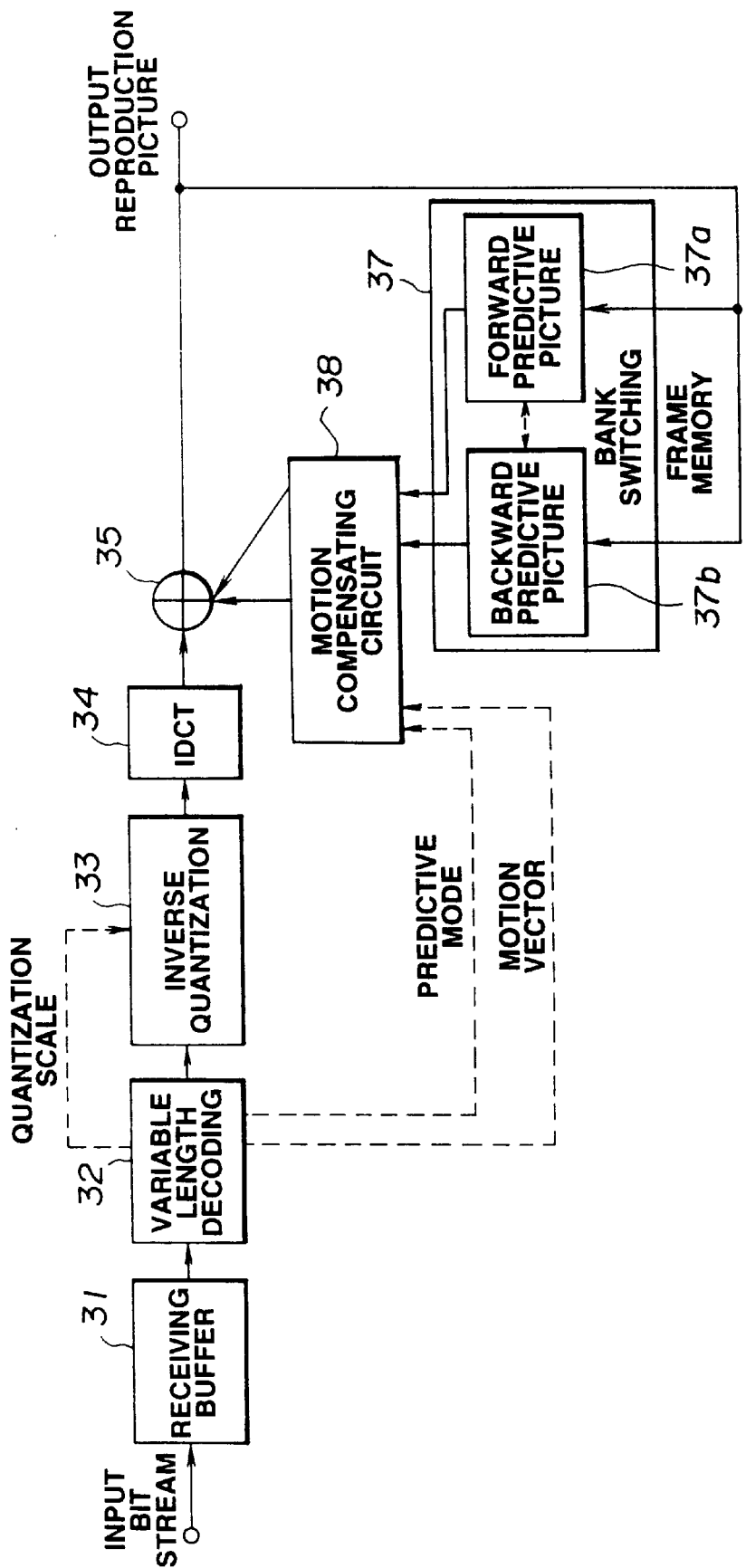
FIG. 5 is a block diagram showing an example of the conventional moving picture decoding apparatus.

Operations of inverse quantizing circuit 33, IDCT circuit 34 and motion compensating circuit 38 are as described in the moving picture encoding apparatus or encoder of FIG. 5, and are the same as that of local decoding circuit of the moving picture encoding apparatus of the FIG. 6 mentioned above.

In actual terms, motion compensating circuit 38 carries out decode operation on the basis of output data of IDCT circuit 34, predictive mode and motion vector to write decode picture into frame memory 37 as forward reference picture or backward reference picture. This reference picture is entirely the same picture as picture locally decoded at the encoder. With respect to the next decode picture, predictive processing in forward direction/both directions is carried out on the basis of the reference picture. It should be noted that MB buffer 102 and DRAM writing buffer 106 are the same, in both function and purpose, as MB buffer 102 and DRAM writing buffer 106 in the block diagram of the encoder of FIG. 6.

Figure 8:
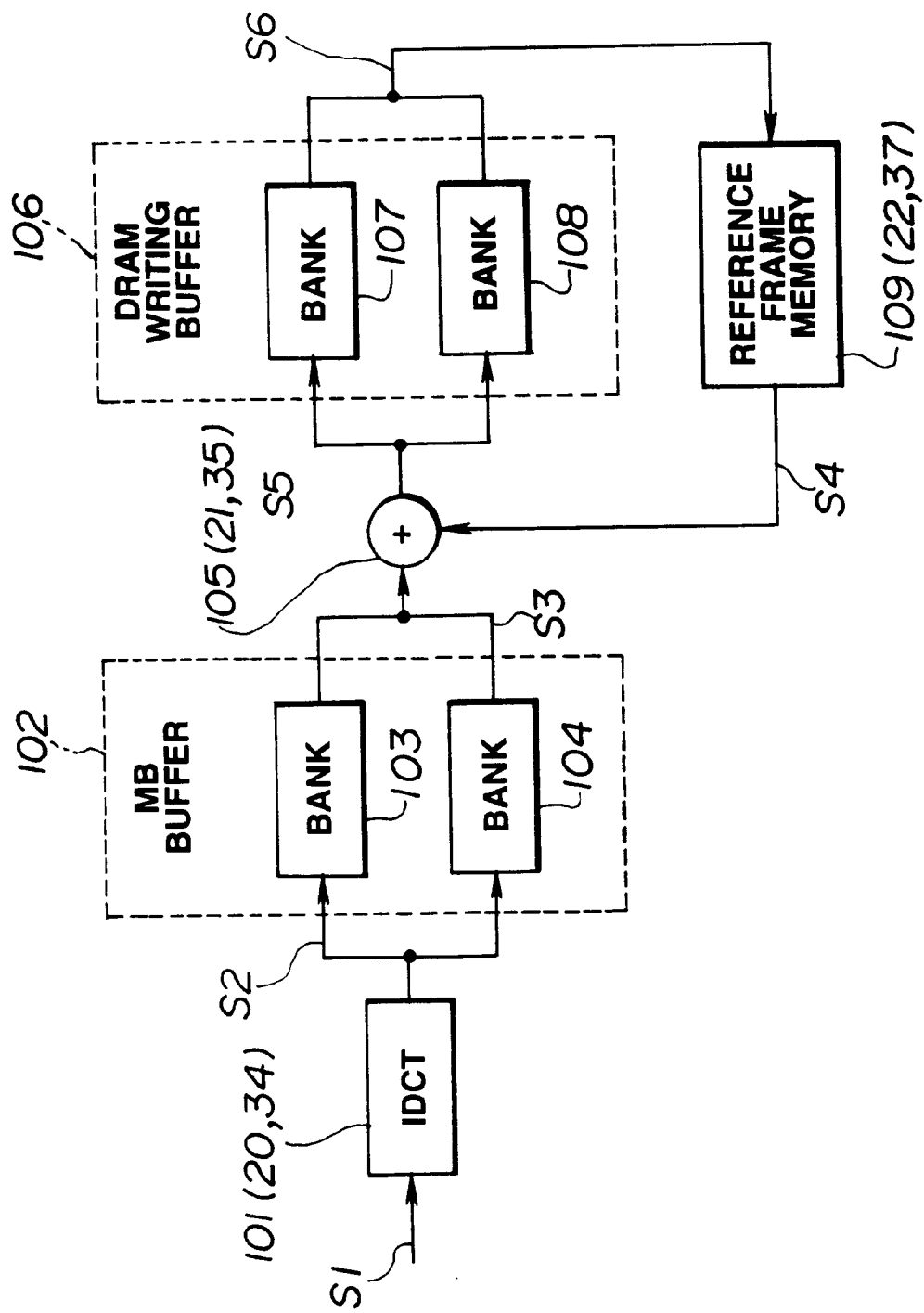
FIG. 8 is a block diagram showing motion compensating section used in the first embodiment of this invention.
Figure 9:
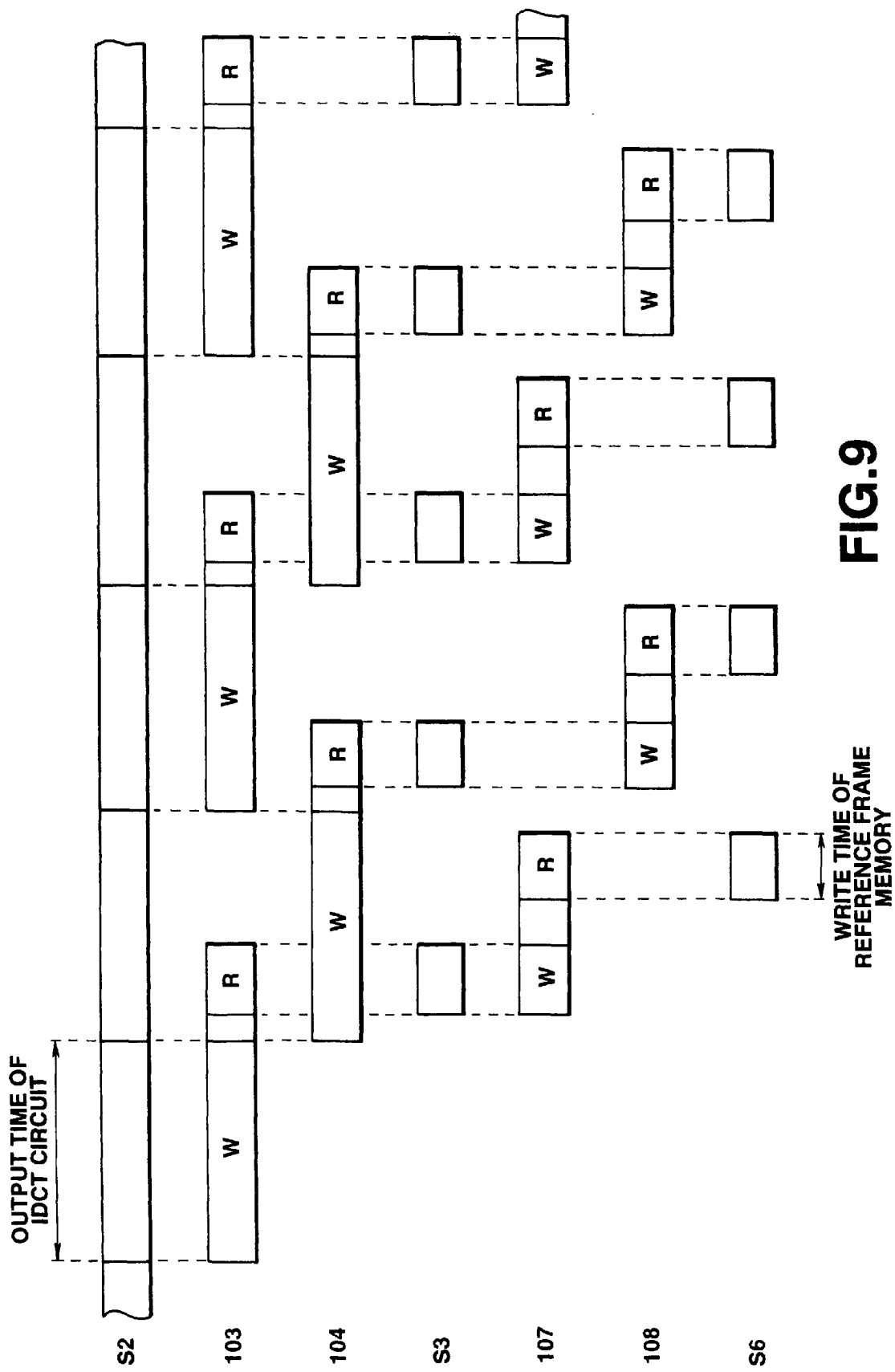
FIG. 9 is a view showing data timing of the motion compensating section used in the first embodiment of this invention.

Block diagram in which the focus is placed on input/output timings of signal in operations of respective buffers is shown in FIG. 8. Timing at that time is shown in FIG. 9. In FIG. 9, W indicates write operation and R indicates read operation.

Respective buffers 102, 106 use, as the memory size (capacity), two banks of memory of size (capacity) of macro block in practice as shown in FIG. 8. Switching between write operation and read operation of that bank is carried out to thereby carry out absorbing of difference between speeds of respective portions and/or timing adjustment. Namely, MB buffer 102 is composed of bank 103 and bank 104 of memory of size (capacity) of macro block, and DRAM writing buffer 106 is similarly composed of bank 107 and bank 108 of memory of size of macro block. Write (W) operation and read (R) operation with respect to these banks 103, 104, 107, 108, and signals S2, S3, S6 of respective portions are shown in FIG. 9.

Write operation is carried out into MB buffer 102 at a speed dependent upon speed of IDCT circuit 101 (corresponding to circuit 20 of FIG. 6 and circuit 34 of FIG. 7) in macro block units as indicated by the timing of signal S2 of FIG. 9. On the other hand, read operation therefrom is carried out at a speed dependent upon write speed of reference frame memory 109 (22 of FIG. 6, 37 of FIG. 7) as indicated by the timing of signal S3 of FIG. 9. In this way, difference of speed is absorbed in MB buffer 102. Data S3 read out from MB buffer 102 is added to predictive macro block signal S4 from reference frame memory 109. Then, added signal is written into DRAM writing buffer 106. Read-out operation is carried out as indicated by the timing of signal S6 of FIG. 9. Here, adjustment of read/write timing of reference frame memory 109 is carried out.

As stated above, motion compensating section carries out motion compensation by data S4 from reference frame memory 109 (22 of FIG. 6, 37 of FIG. 7) and read-out data S2 from IDCT circuit 101 (20 of FIG. 6, 34 of FIG. 7).

By using these buffers, it is possible to absorb difference between read speed from IDCT circuit 101 (20 of FIG. 6, 34 of FIG. 7) and write speed into reference memory 109 (22 of FIG. 6, 37 of FIG. 7), inexpensive DRAM can be used as reference frame memory 109.

Meanwhile, in the above-described first embodiment of this invention, MB buffer 102 and DRAM writing buffer 106 are required to have memory size (capacity) corresponding to four macro blocks. It is therefore desirable to further reduce capacity of memory. In view of this, there may be employed an approach in which circuit of the buffer portion is devised to improve utilization efficiency of buffer to thereby reduce capacity of buffer to further reduce the entire memory capacity, thus to reduce circuit scale.

Namely, in the second embodiment of this invention which will be described later, capacity of DRAM writing buffer is reduced to one half. Moreover, in the third embodiment of this invention, buffer commonly having both functions of MB buffer and DRAM writing buffer is used.

When consideration is made in connection with timings of the first embodiment of this invention shown in FIGS. 8, 9, in the case where read/write speed of frame memory 109 is higher than speed of IDCT circuit 101, read-out operation of data inputted to bank 107 of DRAM writing buffer 106 is completed before the next data is incoming. For this reason, when the next block data is inputted, buffer 106 is in empty state. In accordance with the method of the first embodiment, even if bank 107 is in empty state, there would result the state where data is written into bank 108 and bank 107 continues to be in empty state for this time period. Namely, there is no possibility that DRAM writing buffer 106 may have data of one block or more at all times.

In view of this, there is employed an approach in which DRAM writing buffer is caused to have capacity of one block so that switching of bank is not carried out in the second and third embodiments respectively shown in FIGS.

10 and 12. In these embodiments, positions (connections) of respective DRAM writing buffers 115, 123 are different.

Further, consideration will be made in connection with timings of these second and third embodiments. For example, with respect to banks 112, 113 of MB buffer 111 in the second embodiment of FIG. 10, in the case where read-out time of bank which is carrying out read-out operation opposite to that of bank which is carrying out writing from IDCT circuit 110 is very shorter than write time, this bank is brought into the state waiting for the next writing for a greater part of time. In view of this, for this waiting time, delay operation carried out at DRAM writing buffer 115 is caused to be carried out, thereby making it possible to combine respective buffers into one. This method is shown as the fourth embodiment of this invention in FIG. 14, and its timing is shown in FIG. 15. It is to be noted that this method is effective in the case where write speed into IDCT circuit 126 and write/read speed of reference frame memory 132 are compared with each other, so speed of reference frame memory is sufficiently higher.

Moving picture decoding apparatus or local decoding circuit of moving picture encoding apparatus as the second~forth embodiments of this invention will now be described with reference to the attached drawings. Since configuration except for motion compensating circuit and the peripheral portion thereof does not affect main point (subject) of these embodiments, their explanation is omitted here.

Figure 10:
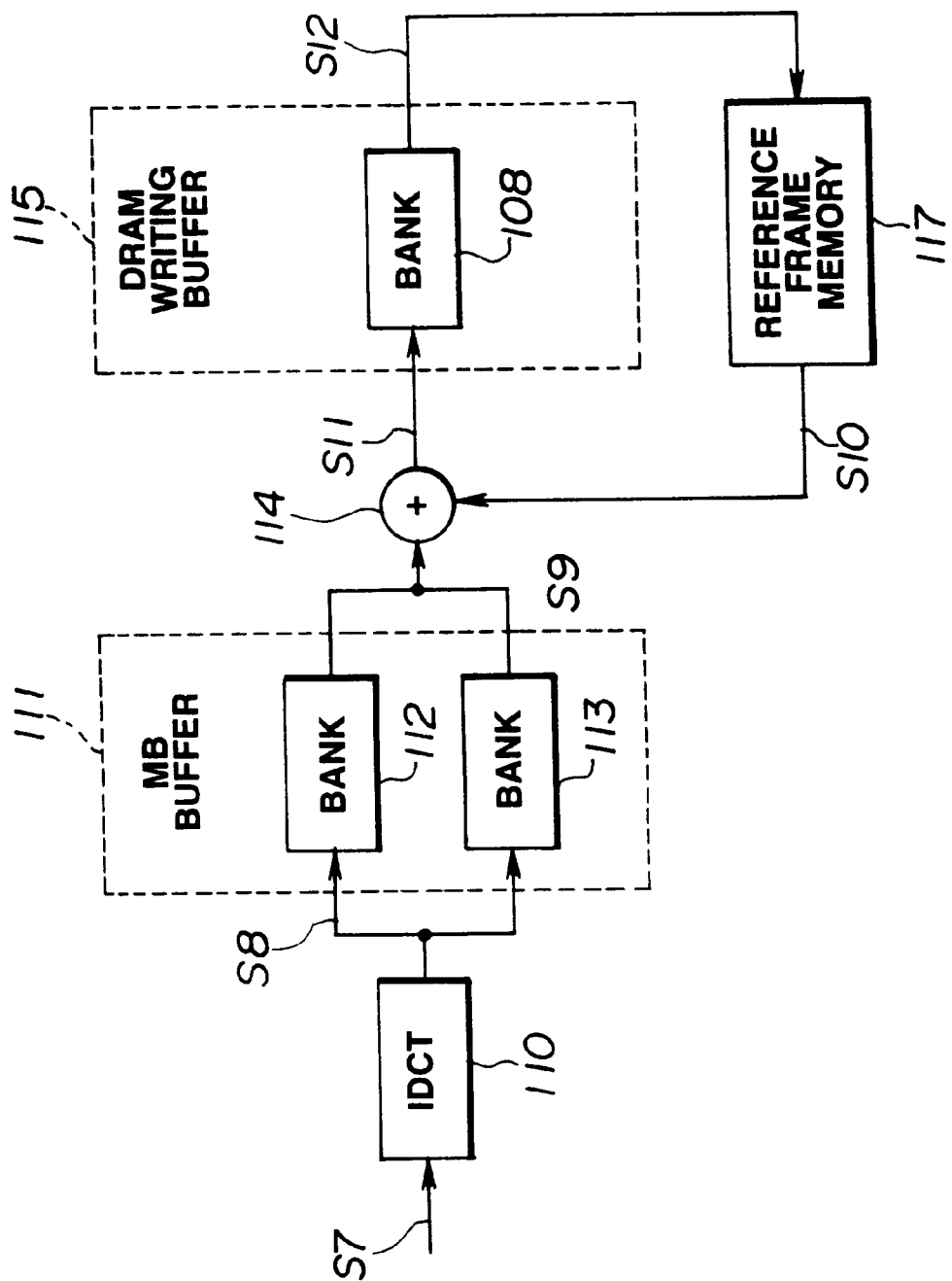
FIG. 10 is a block diagram showing motion compensating section used in a moving picture decoding apparatus which is a second embodiment of this invention.

Local decoding section of moving picture encoding apparatus or motion compensating section within moving picture decoding apparatus is shown in FIG. 10 as the second embodiment of this invention.

Figure 11:
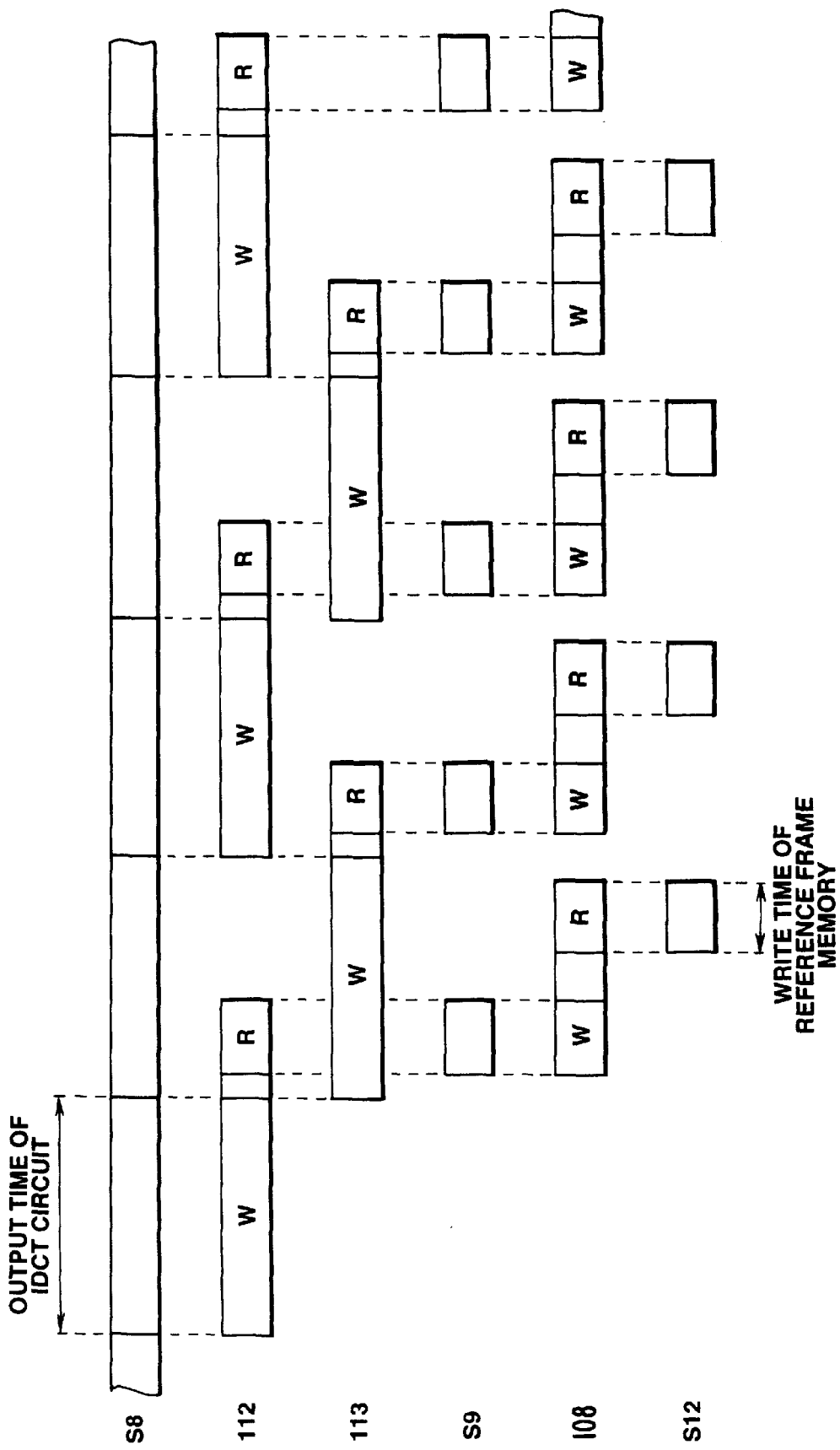
FIG. 11 is a view showing data timing of the motion compensating section used in the second embodiment of this invention.

In the motion compensating section shown in the FIG. 10 mentioned above, data S8 outputted from IDCT circuit 110 is written into MB buffer 111 having two banks at read-out speed of IDCT circuit 110. Read-out operation from MB buffer 111 is carried out at the same speed as read-out speed of reference frame memory 117. At this time, as shown in FIG. 11, when write (W) operation is carried out into one bank 112, the other bank 113 is carrying out read (R) operation, while when write operation is carried out into the other bank 113, one bank 112 is carrying out read operation. Data S9 thus read out is sent to adder 114.

Predictive macro block signal S10 is taken out from reference frame memory 117, and is sent to adder 114. At adder 114, predictive macro block signal S10 from reference frame memory 117 and output signal S9 from MB buffer 111 are added. The added signal thus obtained is written into DRAM writing buffer 115. DRAM writing buffer 115 holds data until reference frame memory 117 completes preparation for write operation thereafter to write them into reference frame memory 117.

At this time, since time from write operation into DRAM writing buffer 115 to read operation therefrom is sufficiently shorter than time required for reading out macro block data from IDCT circuit 110, DRAM writing buffer 115 can perform the function identical to that of the first embodiment by memory size, i.e., memory capacity of one macro block. Thus, memory size (capacity) of DRAM writing buffer 115 can be cut down to one half. In addition, the circuit of the portion which was carrying out bank switching in the first embodiment becomes unnecessary. Thus, circuit is further reduced.

Figure 12:
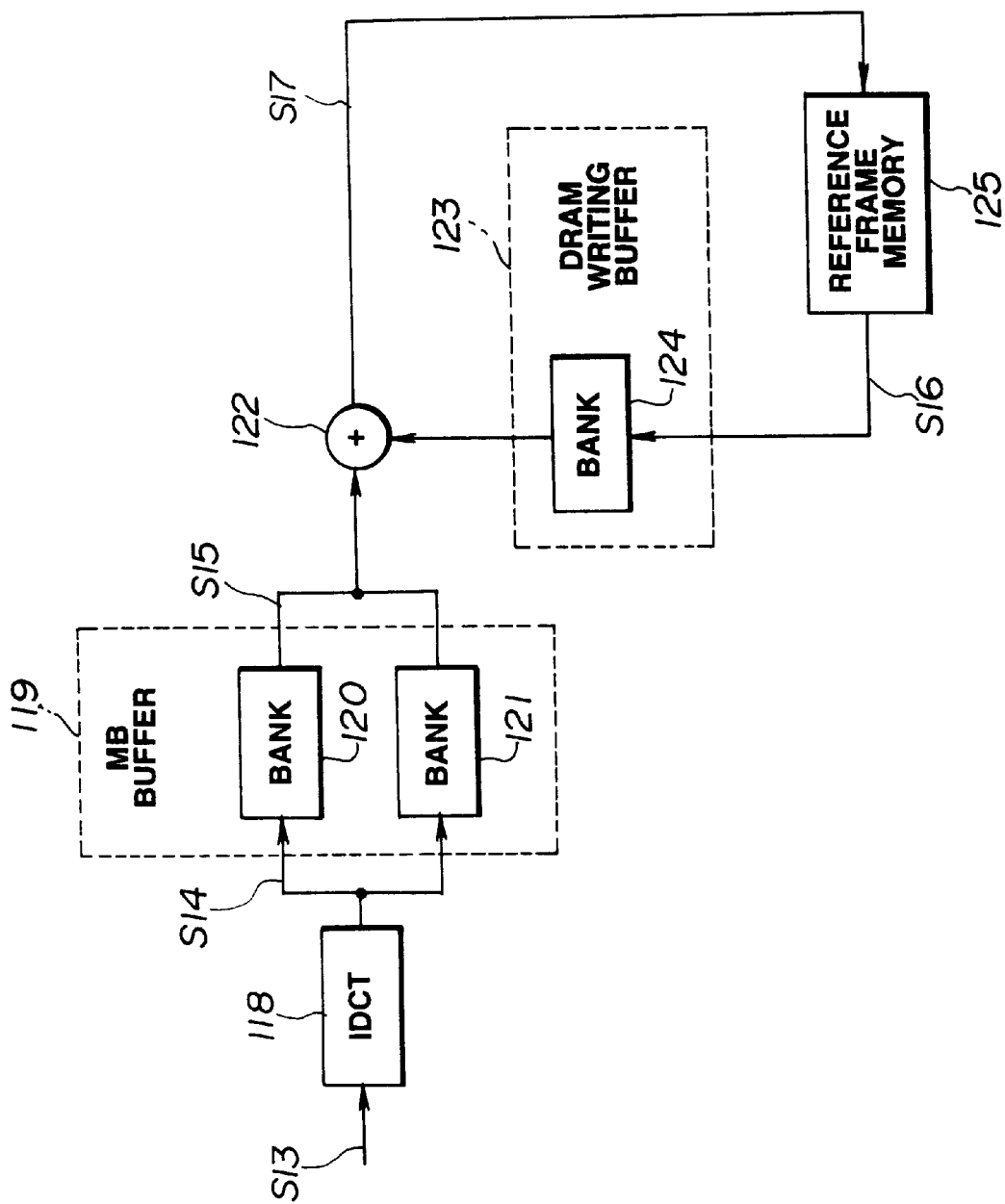
FIG. 12 is a block diagram showing motion compensating section used in a moving picture decoding apparatus which is a third embodiment of this invention.

As the third embodiment of this invention, in the motion compensating circuit of FIG. 12, data S14 outputted from IDCT circuit 118 is written into MB buffer 119 having two banks at read-out speed of IDCT circuit 118.

Figure 13:
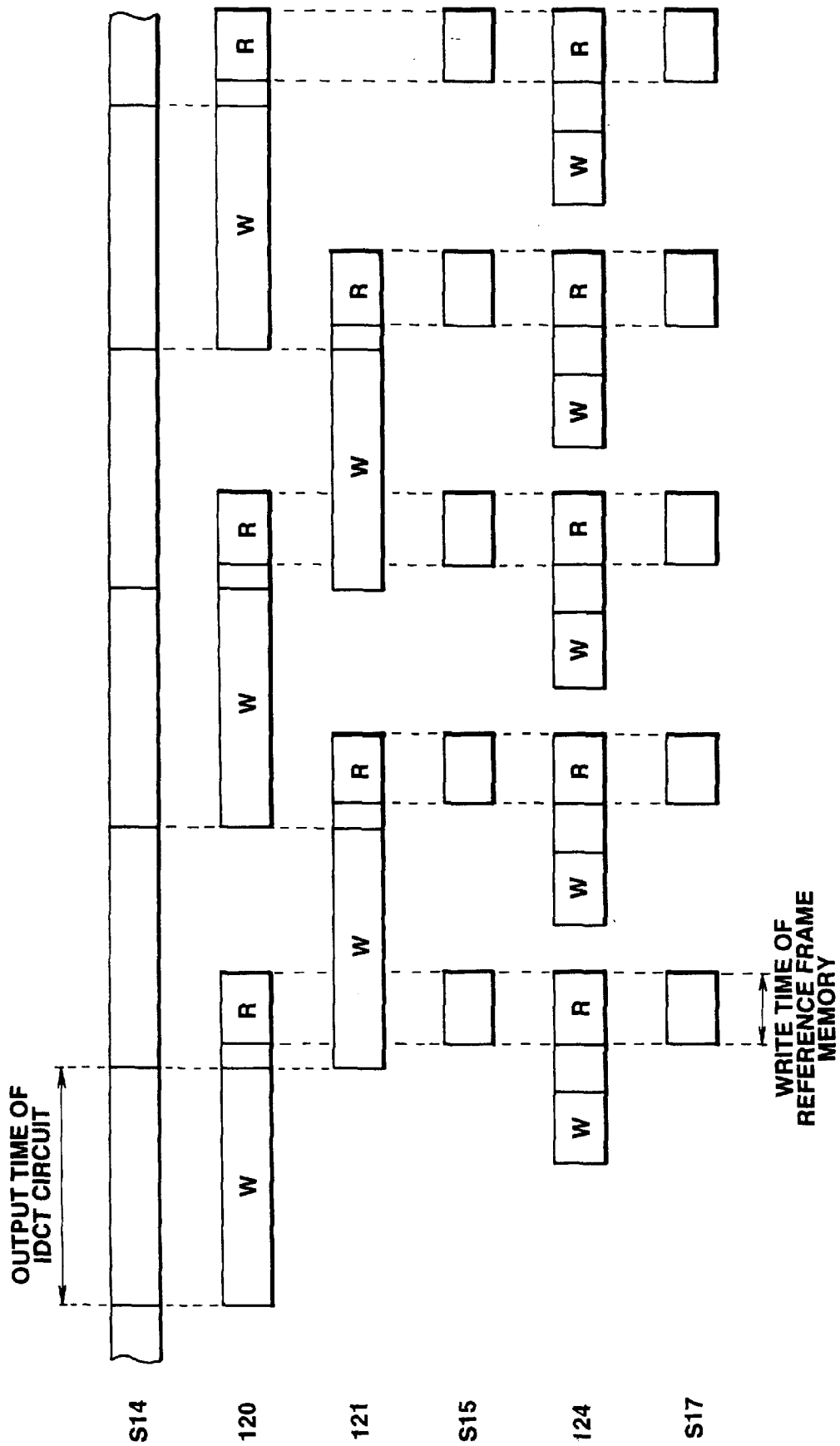
FIG. 13 is a view showing data timing of the motion compensating section used in the third embodiment of this invention.

Read-out operation from MB buffer 119 is carried out at the same speed as read-out speed of reference frame memory 125. At this time, as shown in FIG. 13, when write (W) operation is carried out into one bank 120, the other bank 121 is carrying out read (R) operation, while when write operation is carried out into the other bank 121, one bank 120 is carrying out read-out operation. Read-out operation is carried out in synchronism with write timing of reference frame memory 125, and data is sent to adder 122.

Reference frame memory 125 writes predictive macro block signal S16 into DRAM writing buffer 123. The DRAM writing buffer 123 holds data until reference frame memory 125 completes preparation for write operation to send data to adder 122 as soon as reference frame memory 125 has completed preparation for write operation.

At the adder 122, output data of DRAM writing buffer 123 and output signal S15 from MB buffer 119 are added, and added signal thus obtained is written into reference frame memory 125. At this time, since time required from write operation into DRAM writing buffer 123 to read-out therefrom is sufficiently shorter than time required for reading out macro block data, DRAM writing buffer 123 can perform the functions similar to that of the first embodiment. Thus, memory size (capacity) of DRAM writing buffer 123 can be cut down to one half. In addition, circuit of the portion which was carrying out bank switching in the first embodiment becomes unnecessary. Thus, cost can be further reduced.

Figure 14:
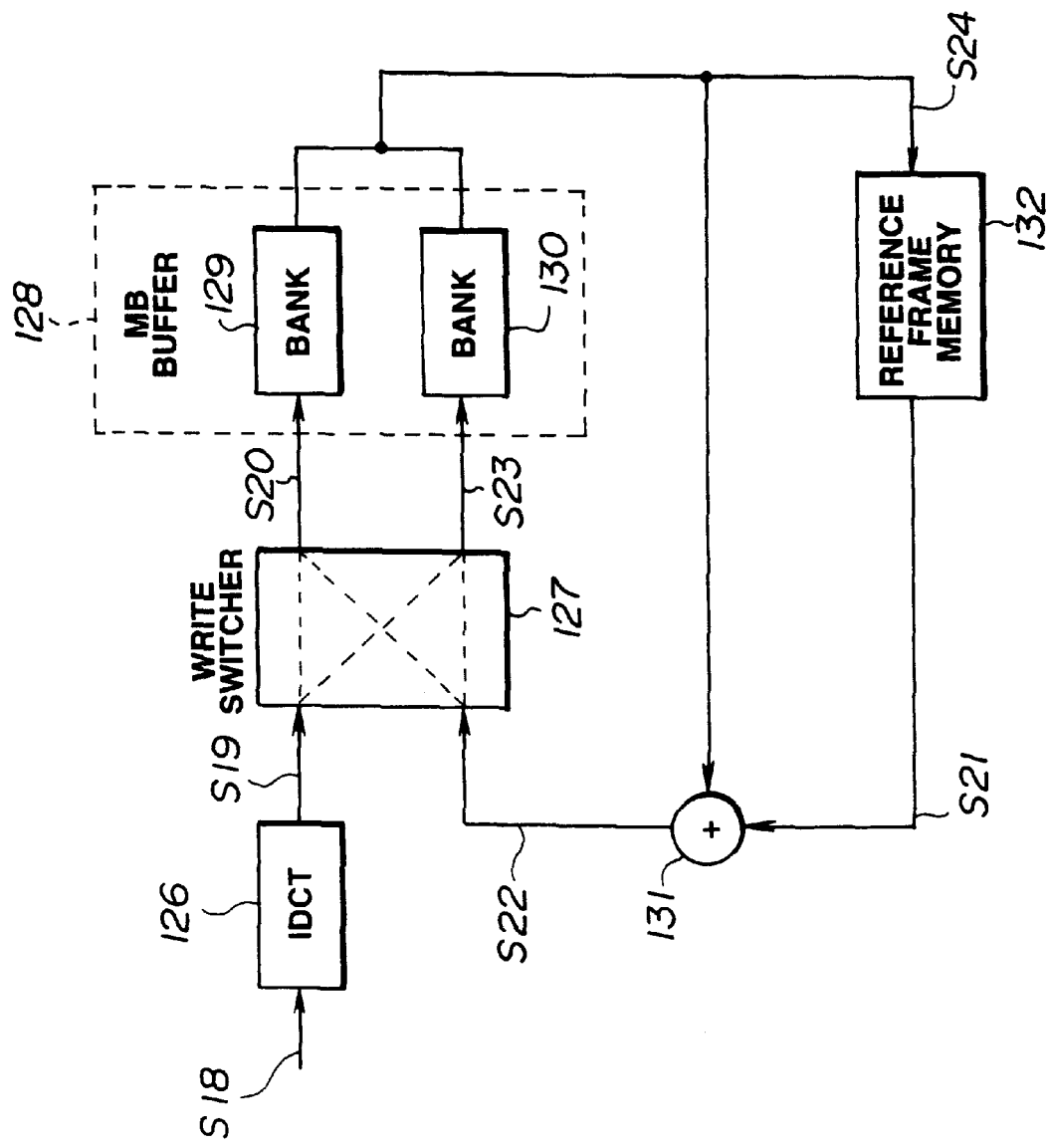
FIG. 14 is a block diagram showing motion compensating section used in a moving picture decoding apparatus which is a fourth embodiment of this invention.
Figure 15:
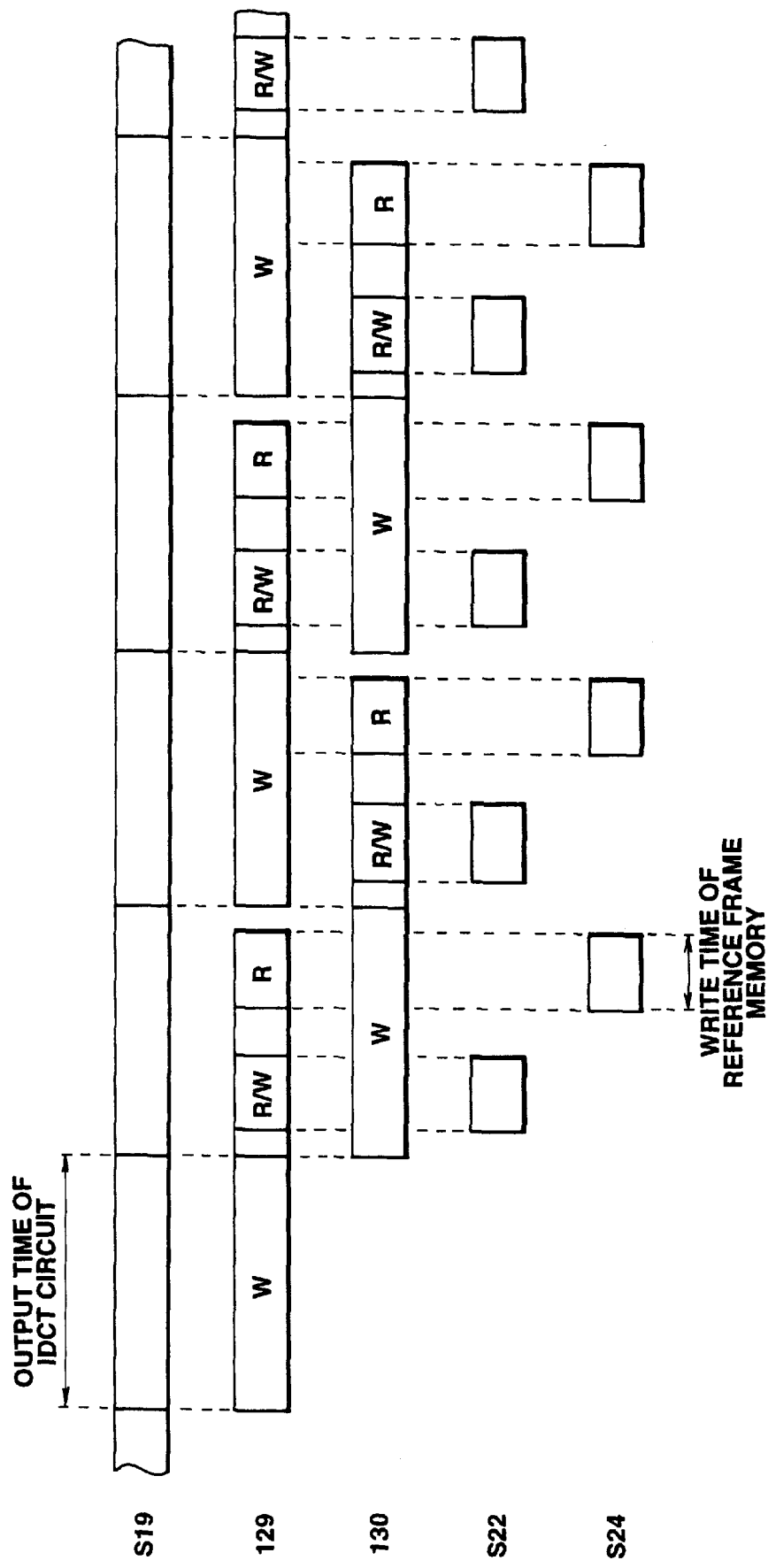
FIG. 15 is a view showing data timing of the motion compensating section used in the fourth embodiment of this invention.

FIG. 14 shows local decoding section of moving picture encoding apparatus or motion-compensating section within moving picture decoding apparatus as the fourth embodiment of this invention.

In FIG. 14, data S19 outputted from IDCT circuit 126 is written into MB buffer 128 having two banks at read-out speed of IDCT circuit 126. Read-out operation from MB buffer 128 is carried out at the same speed as read-out speed of reference frame memory 132. At this time, as shown in FIG. 15, when write operation of output S19 of IDCT circuit 126 is carried out into one bank 129, the other bank 130 is carrying out processing with respect to reference frame memory 132, while when write operation of output S19 of IDCT circuit 126 is being carried out into the other bank 130, one bank 129 is carrying out processing with respect to reference frame memory 132.

With respect to one bank 129 and the other bank 130 of the MB buffer 128, since their inputs are required to undergo switching between output S19 of IDCT circuit and adder output S22 in macro block units, write switcher 127 is placed (provided) at the preceding stage of MB buffer 128.

The write switcher 127 will carry out operation as described below.

When write operation of output S19 of IDCT circuit is being carried out into one bank 129 of MB buffer 128, write switcher 127 connects output S19 of IDCT circuit 126 and input S20 of one bank 129, and connects adder output S22 to input S23 of the other bank 130. When write operation of output S19 of IDCT circuit is being carried out into the other bank 130 of MB buffer 128, write switcher 127 connects output S19 of IDCT circuit and input S23 of the other bank 130, and connects adder output S22 to input S20 of one bank 129.

Processing with respect to reference frame memory 132 will be carried out in accordance with a procedure as described below.

Data S24 which has been read out from MB buffer 128 is first sent to adder 131. Predictive macro block signal S21 is taken out from reference frame memory 132, and is then sent to adder 131. Adder 131 adds predictive macro block signal S21 from reference frame memory 132 and output signal S24 from MB buffer 128 to write the added signal into MB buffer 128 for a second time. At this time, dual port RAM is used as MB buffer 128, thereby making it possible to simultaneously carry out read and write operations.

MB buffer 128 holds data until write operation into reference frame memory 132 is completed thereafter to carry out read-out operation for a second time to write it into reference frame memory 132. By this method, it is possible to reduce capacity of buffer at motion compensating section to one half. It should be noted that these methods are effective in the case where write speed into IDCT circuit 126 and write/read speed of reference frame memory 132 are compared with each other, so speed of reference frame memory 132 is sufficiently higher.

Accordingly, while buffer of memory size (capacity) corresponding to four macro blocks in total was required in the motion compensating section of the first embodiment, in accordance with the above-described fourth embodiment, memory size of buffer can be reduced to memory size corresponding to two macro blocks without allowing timing from input and timing to reference frame memory to be out of order. As a result, memory capacity can be reduced to much degree. Thus, scale of hardware can be reduced.

What is claimed is:

1. A picture decoding method of decoding a coded picture signal encoded by using predictive encoding and Discrete Cosine Transform (hereinafter simply referred to as DCT) processing, the method comprising the steps of:
implementing Inverse Discrete Cosine Transform (hereinafter simply referred to as IDCT) processing to DCT coefficients;
storing the IDCT processed data into a first buffer;
adding a predictive picture read out from a reference memory and data read out from the first buffer to generate a decoded picture;
storing the decoded picture into a second buffer wherein the first buffer doubles as the second buffer; and
storing the decoded picture read out from the second buffer into the reference memory.

2. A picture decoding method as set forth in claim 1, wherein the first buffer is composed of a first bank and a second bank each having capacity corresponding to at least one macro block,
the IDCT processed data being alternately written into the first and second banks at the same speed as a read-out speed of the IDCT processing in macro block units,
data stored in the first and second banks being alternately read out at the same speed as a read-out speed of the reference memory.

3. A picture decoding method as set forth in claim 1, wherein the decoded picture is read out in synchronism with a write timing of the reference memory from the second buffer.

4. A picture decoding method as set forth in claim 1, wherein the decoded picture is read out in synchronism with a write timing of the reference memory from the first buffer.

5. A picture decoding method of decoding a coded picture signal encoded by using predictive encoding and DCT processing,
the method comprising the steps of:
implementing IDCT processing to the DCT coefficients;
storing the IDCT processed picture data into a first buffer;
adding data read out from the first buffer and a predictive picture read out from a second buffer to generate a decoded picture wherein the first buffer doubles as the second buffer;
storing the decoded picture into a reference memory for generating the predictive picture;
reading out the predictive picture from the reference memory; and
storing the predictive picture read out from the reference memory into the second buffer.

6. A picture decoding method as set forth in claim 5, wherein the first buffer is composed of a first bank and a second bank each having capacity corresponding to at least one macro block,
the IDCT processed picture data being alternately written into the first and second banks at the same speed as a read-out speed of the IDCT processing in macro block units,
data stored in the first and second banks being alternately read out at the same speed as a read-out speed of the reference memory.

7. A picture decoding method as set forth in claim 5, wherein the predictive picture is read out in synchronism with a write timing of the reference memory from the second buffer.

8. A picture decoding apparatus adapted for decoding a coded picture signal encoded by predictive encoding and DCT processing,
the apparatus comprising:
IDCT means for implementing IDCT processing to DCT coefficients;
a first buffer for storing the IDCT processed data;
adding means for adding a predictive picture read out from a reference memory and data read out from the first buffer to generate a decoded picture;
a second buffer for storing the decoded picture wherein the first buffer doubles as the second buffer; and
the reference memory for storing the decoded picture read out from the second buffer.

9. A picture decoding apparatus as set forth in claim 8, wherein the first buffer is composed of a first bank and a second bank each having capacity corresponding to at least one macro block,
the IDCT processed data being alternately stored into the first and second banks at the same speed as a read-out speed of the IDCT processing in macro blocks,
data stored in the first and second banks being alternately read out at the same speed as a read-out speed of the reference memory.

10. A picture decoding apparatus as set forth in claim 8, wherein the decoded picture is read out in synchronism with a write timing of the reference memory from the second buffer.

11. A picture decoding apparatus as set forth in claim 8, wherein the first buffer doubles as the second buffer and is comprised of a dual port RAM having two banks,
the apparatus including:
switching means for inputting an output of the IDCT means and an output of the adding means to either of the two banks;
the decoded picture being read out in synchronism with a write timing of the reference memory from the first buffer.

12. A picture decoding apparatus adapted for decoding a coded picture signal encoded by using predictive encoding and DCT processing, the apparatus comprising:
IDCT means for implementing IDCT processing to the DCT coefficients;
a first buffer for storing the IDCT processed picture data;
adding means for adding data read out from the first buffer and a predictive picture read out from a second buffer to generate a decoded picture wherein the first buffer doubles as the second buffer;
a reference memory for generating the predictive picture, which is adapted to store the decoded picture; and
the second buffer for storing the predictive picture read out from the reference memory.

13. A picture decoding apparatus as set forth in claim 12,
wherein the first buffer is composed of a first bank and a second bank each having capacity corresponding to at least one macro block,
the IDCT processed picture data being alternately written into the first and second banks at the same speed of a read-out speed of the IDCT processing in macro block units,
data stored in the first and second banks being alternately read out at the same speed as a read-out speed of the reference memory.

14. A picture decoding apparatus as set forth in claim 12,
wherein the predictive picture is read out in synchronism with a write timing of the reference memory from the second buffer.

15. A picture encoding method using predictive encoding and DCT processing,
the method comprising the steps of:
implementing DCT processing to picture data to generate DCT coefficients;
implementing IDCT processing to the DCT coefficients;
storing the IDCT processed data into a first buffer;
adding a predictive picture read out from a reference memory and data read out from the first buffer to generate a locally decoded picture;
storing the locally decoded picture into a second buffer wherein the first buffer doubles as the second buffer; and
storing the locally decoded picture read out from the second buffer into the reference memory.

16. A picture encoding method as set forth in claim 12,
the method including the steps of:
calculating a difference between input picture data and the predictive picture,
storing the difference into a buffer; and
reading out the difference stored in the buffer as the picture data.

17. A picture encoding method as set forth in claim 15,
wherein the first buffer is composed of a first bank and a second bank each having capacity corresponding to at least one macro block,
the IDCT processed data being alternately written into the first and second banks at the same speed as a read-out speed of the IDCT processing in macro block units,
data stored in the first and second banks being alternately read out at the same speed as a read-out speed of the reference memory.

18. A picture encoding method as set forth in claim 15,
wherein the locally decoded picture is read out in synchronism with a write timing of the reference memory from the second buffer.

19. A picture encoding method as set forth in claim 15,
wherein
the locally decoded picture is read out in synchronism with a write timing of the reference memory from the first buffer.

20. A picture encoding method using predictive encoding and DCT processing,
the method comprising the steps of:
implementing DCT processing to picture data to generate DCT coefficients;
implementing IDCT processing to the DCT coefficients;
storing the IDCT processed picture data into a first buffer;
adding data read out from the first buffer and a predictive picture read out from a second buffer to generate a locally decoded picture wherein the first buffer doubles as the second buffer;
storing the locally decoded picture into a reference memory for generating the predictive picture;
reading out the predictive picture from the reference memory; and
storing the predictive picture read out from the reference memory into the second buffer.

21. A picture encoding method as set forth in claim 20, which includes the steps of:
calculating a difference between input picture data and the predictive picture;
storing the difference into a buffer;
reading out the difference stored in the buffer as the picture data.

22. A picture encoding method as set forth in claim 20,
wherein the first buffer is composed of a first bank and a second bank each having capacity corresponding to at least one macro block,
the IDCT processed picture data being alternately written into the first and second banks at the same speed as a read-out speed of the IDCT processing in macro block units,
data stored in the first and second banks being alternately read out at the same speed as a read-out speed of the reference memory.

23. A picture encoding method as set forth in claim 20,
wherein the predictive picture is read out in synchronism with a write timing of the reference memory from the second buffer.

24. A picture encoding apparatus using predictive encoding and DCT processing,
the apparatus comprising:
DCT means for implementing DCT processing to picture data to generate DCT coefficients;
IDCT means for implementing IDCT processing to the DCT coefficients;
a first buffer for storing the IDCT processed data;
adding means for adding a predictive picture read out from a reference memory and data read out from the first buffer to generate a locally decoded picture;
a second buffer for storing the locally decoded picture wherein the first buffer doubles as the second buffer; and
the reference memory for storing the locally decoded picture read out from the second buffer.

25. A picture encoding apparatus as set forth in claim 24, which includes:
   means for calculating a difference between input picture data and the predictive picture; and
   a buffer for storing the difference;
   the DCT processing means being operative to implement DCT processing to a difference read out from the buffer.

26. A picture encoding apparatus as set forth in claim 24, wherein the first buffer is composed of a first bank and a second bank each having capacity corresponding to at least one macro block,
   the IDCT processed data being alternately written into the first and second banks at the same speed as a read-out speed of the IDCT processing in macro block units,
   data stored in the first and second banks being alternately read out at the same speed as a read-out speed of the reference memory.

27. A picture encoding apparatus as set forth in claim 24, wherein the locally decoded picture is read out in synchronism with a write timing of the reference memory from the second buffer.

28. A picture encoding apparatus as set forth in claim 24, wherein the first buffer is comprised of a dual port RAM having two banks,
   the apparatus including:
      switching means for inputting an output of the IDCT means and an output of the adding means to either of the two banks,
      the decoded picture being read out in synchronism with a write timing of the reference memory from the first buffer.

29. A picture encoding apparatus using predictive encoding and DCT processing,
   the apparatus comprising:
      DCT means for implementing DCT processing to picture data to generate DCT coefficients;
      IDCT means for implementing IDCT processing to the DCT coefficients;
      a first buffer for storing the IDCT processed picture data;
      adding means for adding data read out from the first buffer and a predictive picture read out from a second buffer to generate a locally decoded picture wherein the first buffer doubles as the second buffer;
      a reference memory for generating the predictive picture, which is adapted to store the locally decoded picture; and
      a second buffer for storing the predictive picture read out from the reference memory.

30. A picture encoding apparatus as set forth in claim 29, the apparatus comprising:
   means for calculating a difference between input picture data and the predictive picture; and
   a buffer for storing the difference,
   the DCT means being operative to implement DCT processing to a difference read out from the buffer.

31. A picture encoding apparatus as set forth in claim 29, wherein the first buffer is composed of a first bank and a second bank each having capacity corresponding to at least one macro block,
   the IDCT processed picture data being alternately written into the first and second banks at the same speed as a read-out speed of the IDCT processing in macro block units,
   data stored in the first and second banks being alternately read out at the same speed as a read-out speed of the reference memory.

32. A picture encoding apparatus as set forth in claim 29, wherein the predictive picture is read out in synchronism with a write timing of the reference memory from the second buffer.

* * * * *